US011178110B2

(12) United States Patent
Adam et al.

(10) Patent No.: US 11,178,110 B2
(45) Date of Patent: Nov. 16, 2021

(54) CONTROLLING COMPLIANCE REMEDIATIONS

(71) Applicant: International Business Machines Corporation, Armonk, NY (US)

(72) Inventors: Constantin M. Adam, Fairfield, CT (US); Jeffrey E. Lammers, Cleveland, OH (US); Muhammed Fatih Bulut, Ossining, NY (US); Milton H. Hernandez, Tenafly, NJ (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 304 days.

(21) Appl. No.: 16/545,977

(22) Filed: Aug. 20, 2019

(65) Prior Publication Data

US 2021/0058370 A1 Feb. 25, 2021

(51) Int. Cl.
*H04L 29/06* (2006.01)
*G06F 21/57* (2013.01)

(52) U.S. Cl.
CPC ........ *H04L 63/0263* (2013.01); *G06F 21/577* (2013.01)

(58) Field of Classification Search
CPC .... H04L 63/0263; H04L 63/20; G06F 21/577
See application file for complete search history.

(56) References Cited

U.S. PATENT DOCUMENTS

| 7,904,909 | B1 * | 3/2011 | Reiner | G06F 9/5061 |
| | | | | 718/104 |
| 8,874,685 | B1 * | 10/2014 | Hollis | H04L 63/20 |
| | | | | 709/217 |
| 8,949,826 | B2 * | 2/2015 | Fitzgerald | G06F 9/45533 |
| | | | | 718/1 |
| 10,033,766 | B2 * | 7/2018 | Gupta | H04L 63/20 |
| 10,326,841 | B2 * | 6/2019 | Bradley | H04L 63/102 |
| 10,440,134 | B1 * | 10/2019 | Trachtenberg | H04L 51/12 |

(Continued)

OTHER PUBLICATIONS

Martinelli, Fabio, Paolo Mori, and Andrea Saracino. "Enhancing android permission through usage control: a BYOD use-case." Proceedings of the 31st Annual ACM Symposium on Applied Computing. 2016. (Year: 2016).*

(Continued)

*Primary Examiner* — Robert B Leung
*Assistant Examiner* — Sameera Wickramasuriya
(74) *Attorney, Agent, or Firm* — Sherman IP LLP; Kenneth L. Sherman; Steven Laut

(57) ABSTRACT

A method provides for controlling compliance remediation that includes performing compliance inspection runs by account nodes for multiple accounts. Inspection results of the inspection runs from each account node are aggregated by an account cognitive policy advisory (CPA) service. The inspection results from each account are aggregated. It is determined whether remediations are required by analyzing the inspection results combined with a current compliance mode of a server. Upon a determination that the current compliance mode of the server is a first mode, the account CPA service determines whether a policy fingerprint has changed. Upon a change to the policy fingerprint, compliance enforcement runs on the account nodes are temporarily suspended.

20 Claims, 8 Drawing Sheets

(56) References Cited

U.S. PATENT DOCUMENTS

| | | | |
|---|---|---|---|
| 2006/0235964 A1* | 10/2006 | Childress | H04L 63/123 709/224 |
| 2007/0055752 A1* | 3/2007 | Wiegand | H04L 67/14 709/220 |
| 2010/0205657 A1* | 8/2010 | Manring | G06F 21/57 726/5 |
| 2011/0004941 A1* | 1/2011 | Mendez | H04L 63/1441 726/26 |
| 2011/0099255 A1* | 4/2011 | Srinivasan | H04L 63/20 709/221 |
| 2012/0084412 A1* | 4/2012 | Burns | H04L 41/0893 709/221 |
| 2012/0240232 A1* | 9/2012 | Azuma | H04L 63/20 726/24 |
| 2013/0007245 A1* | 1/2013 | Malik | H04L 41/0893 709/223 |
| 2013/0239192 A1* | 9/2013 | Linga | G06F 3/0482 726/7 |
| 2014/0025593 A1* | 1/2014 | Dolin | G06Q 90/00 705/317 |
| 2014/0032759 A1* | 1/2014 | Barton | H04W 12/06 709/225 |
| 2014/0053238 A1* | 2/2014 | Brannon | H04L 9/3231 726/1 |
| 2014/0109190 A1* | 4/2014 | Cam-Winget | G06F 21/6218 726/4 |
| 2015/0052616 A1* | 2/2015 | Hutchison | G06F 21/57 726/27 |
| 2015/0067342 A1 | 3/2015 | Pazdziora et al. | |
| 2015/0326528 A1* | 11/2015 | Murthy | H04L 63/0892 726/1 |
| 2016/0088021 A1* | 3/2016 | Jayanti Venkata | H04L 63/105 726/1 |
| 2016/0286394 A1* | 9/2016 | Iyer | H04W 4/021 |
| 2017/0154189 A1* | 6/2017 | Betzler | G06F 9/45558 |
| 2017/0286689 A1* | 10/2017 | Kelley | G06F 21/577 |
| 2017/0374061 A1 | 12/2017 | Venkata et al. | |
| 2018/0176254 A1* | 6/2018 | Lam | H04L 63/1408 |
| 2019/0075082 A1 | 3/2019 | Adam et al. | |
| 2019/0250898 A1* | 8/2019 | Yang | H04L 63/1408 |
| 2020/0287793 A1* | 9/2020 | Buck | G06F 21/577 |

OTHER PUBLICATIONS

B. Hauer, "Data and Information Leakage Prevention Within the Scope of Information Security," in IEEE Access, vol. 3, pp. 2554-2565, 2015, doi: 10.1109/ACCESS.2015.2506185. (Year: 2015).*

Mell et al., "The NIST Definition of Cloud Computing," National Institute of Standards and Technology Special Publication 800-145, Sep. 2011, 7 pages.

* cited by examiner

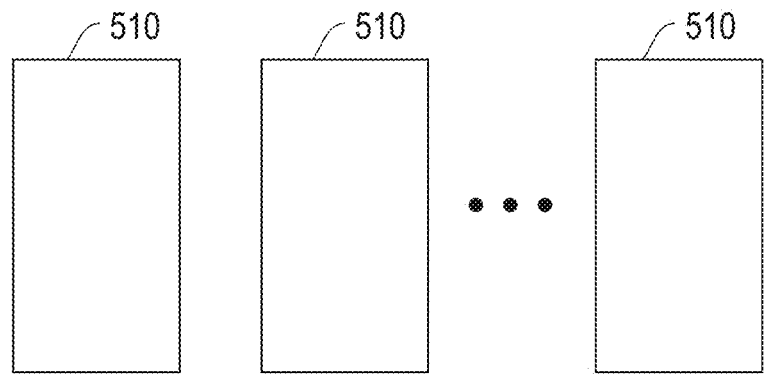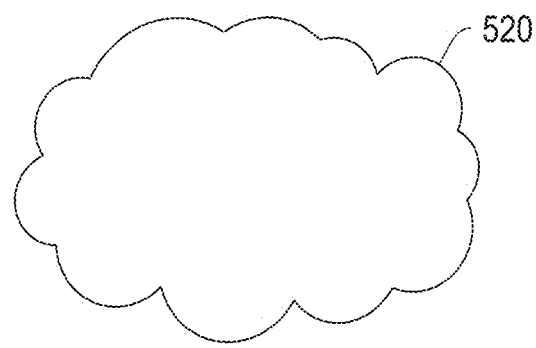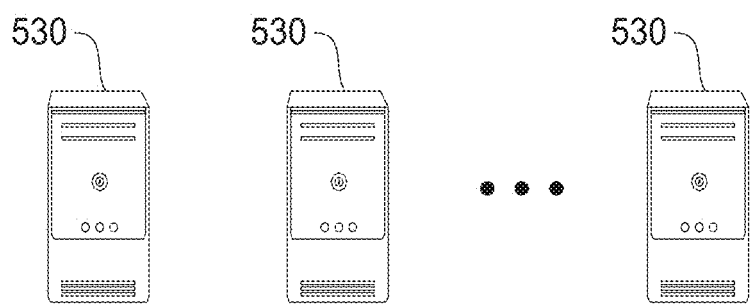
FIG. 5

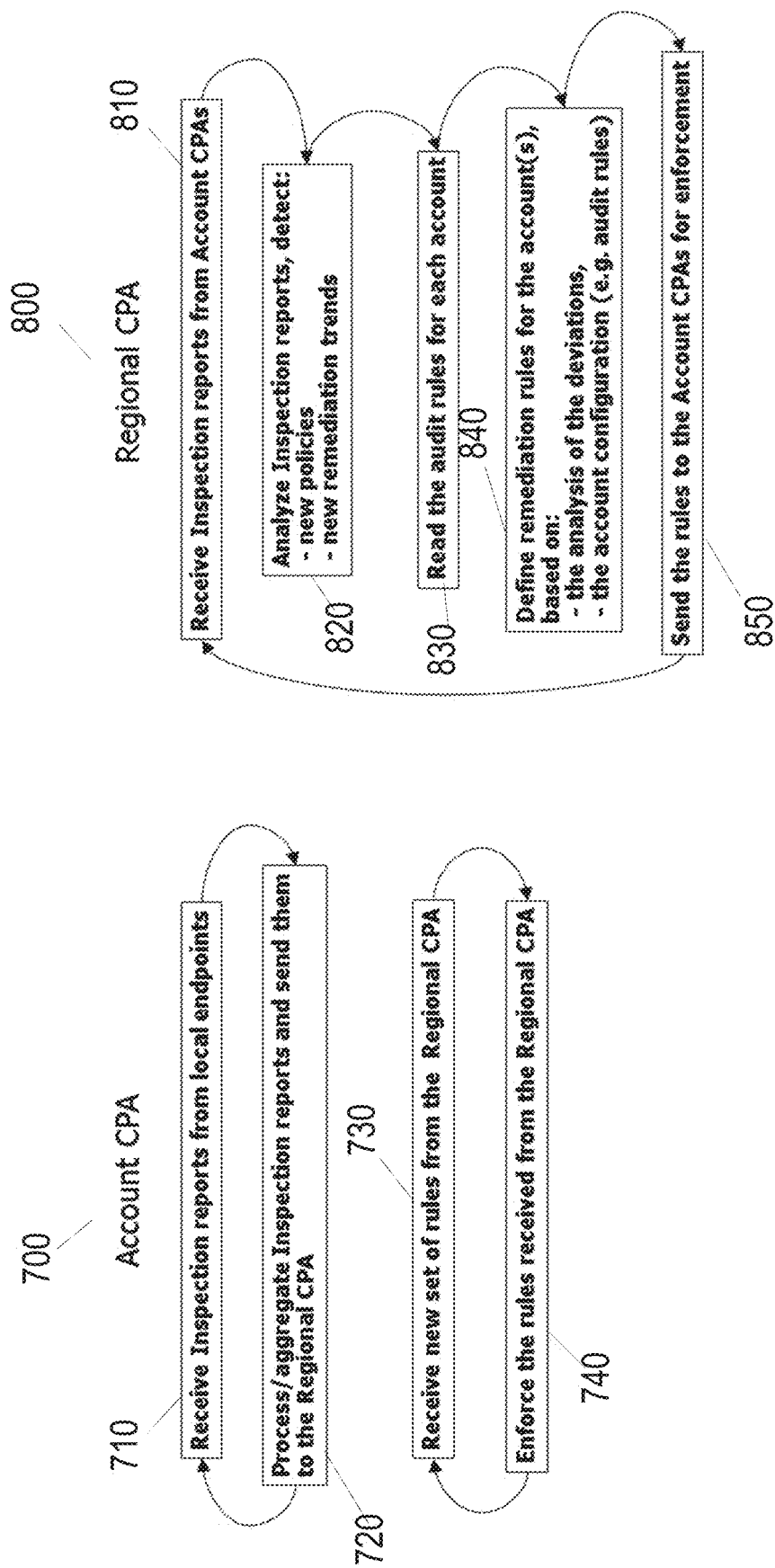

CONTROLLING COMPLIANCE REMEDIATIONS

BACKGROUND

Continuous compliance is an automation that monitors, periodically, computers located on a client premises. On each client machine, continuous compliance executes a set of scripts defined in a run or processing list. A problem with continuous compliance is that clients are reticent to deploy new scripts to enforce new policies as they cannot be sure that, after the new scripts are applied, the managed endpoints will still work properly. The same problem occurs when changes are made to existing scripts. Deploying the new scripts in a test environment first can catch some of the potential issues for compliance remediation (i.e., remediate or fix a compliance policy or rule error), but it cannot offer insurance that all the issues will be covered.

SUMMARY

Embodiments relate to controlling compliance remediations. One embodiment provides a method for controlling compliance remediation that includes performing compliance inspection runs by account nodes for multiple accounts. Inspection results of the inspection runs from each account node are aggregated by an account cognitive policy advisory (CPA) service. The inspection results from each account are aggregated by a regional CPA service. It is determined whether remediations are required by analyzing the inspection results combined with a current compliance mode of a server. Upon a determination that the current compliance mode of the server is a first mode, the account CPA service determines whether a policy fingerprint has changed. Upon a change to the policy fingerprint, compliance enforcement runs on the account nodes are temporarily suspended These and other features, aspects and advantages of the present embodiments will become understood with reference to the following description, appended claims and accompanying figures.

BRIEF DESCRIPTION OF THE DRAWINGS

FIG. 5 is a block diagram illustrating a distributed system for controlling compliance remediations processing, according to one embodiment;

FIG. 7 illustrates an example of an account cognitive policy advisory (CPA) service flow, according to one embodiment;

FIG. 8 illustrates an example of a regional CPA service flow, according to one embodiment.

DETAILED DESCRIPTION

Figure 1:
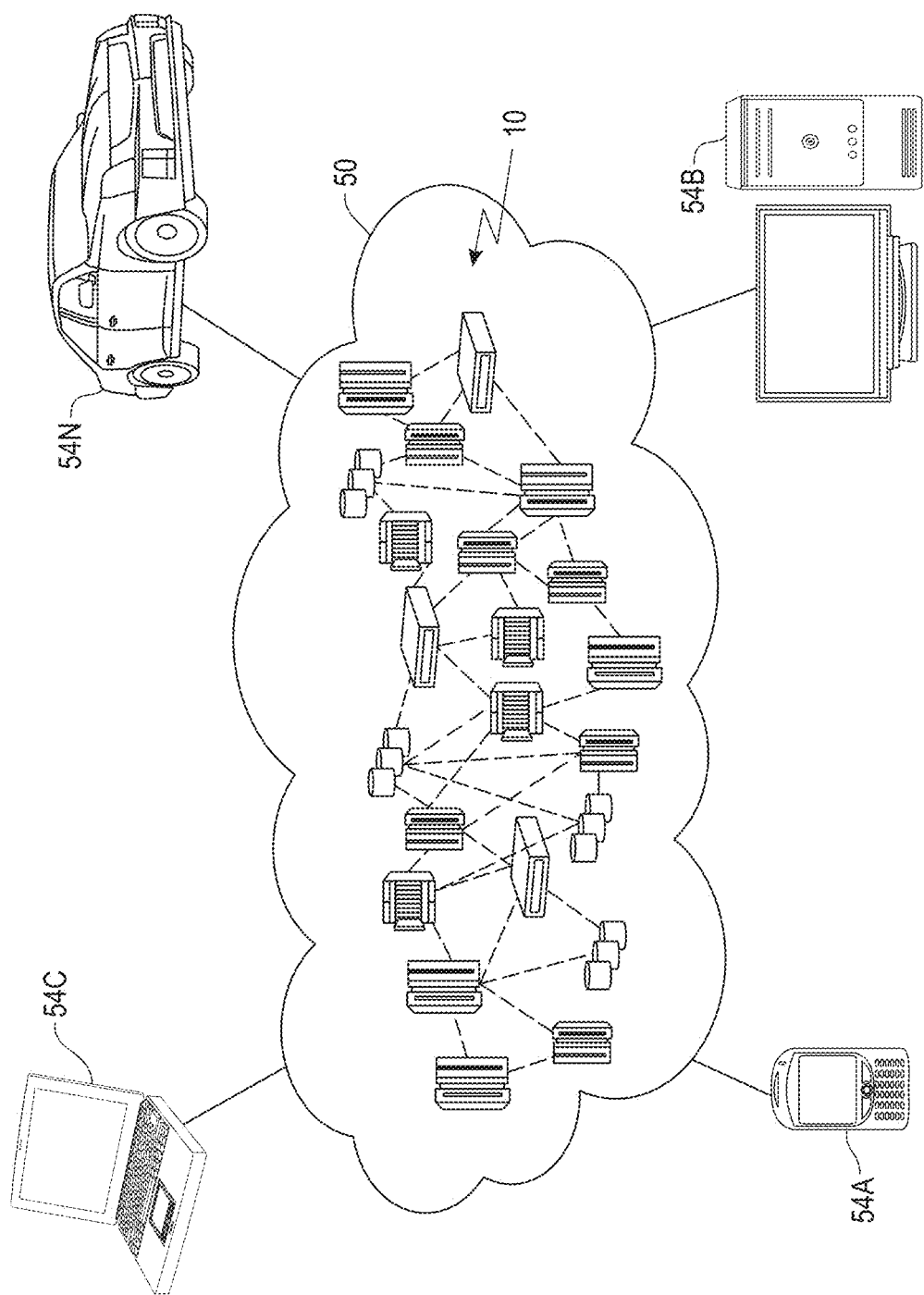
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present embodiments are capable of being implemented in conjunction with any other type of computing environment now known or later developed.

Embodiments relate to controlling compliance remediations for cognitive policy advisory (CPA) services. One embodiment provides a method for controlling compliance remediation that includes performing compliance inspection runs on the managed nodes for a plurality of accounts. Inspection results of the inspection runs on all the nodes in each account are aggregated by the account CPA service, and the inspection results from the accounts are aggregated by the regional CPA service. It is determined whether remediations are required by analyzing the inspection results combined with a current compliance mode of a server. Upon a determination that the server is in enforcement mode, the account CPA service determines whether a policy fingerprint has changed and suspends compliance enforcement runs if a policy fingerprint has changed. Upon a determination that the policy fingerprint has changed within a predetermined time period, the account CPA service resumes the compliance enforcement runs. Upon a determination that the policy fingerprints have not changed, and that none of the local rules are violated, the server is remediated. The regional CPA service analyzes policy deviation trends. Based on the policy deviation trends, the regional CPA service determines what are the rules to stop compliance enforcement and disseminates those rules to the Account CPA services.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
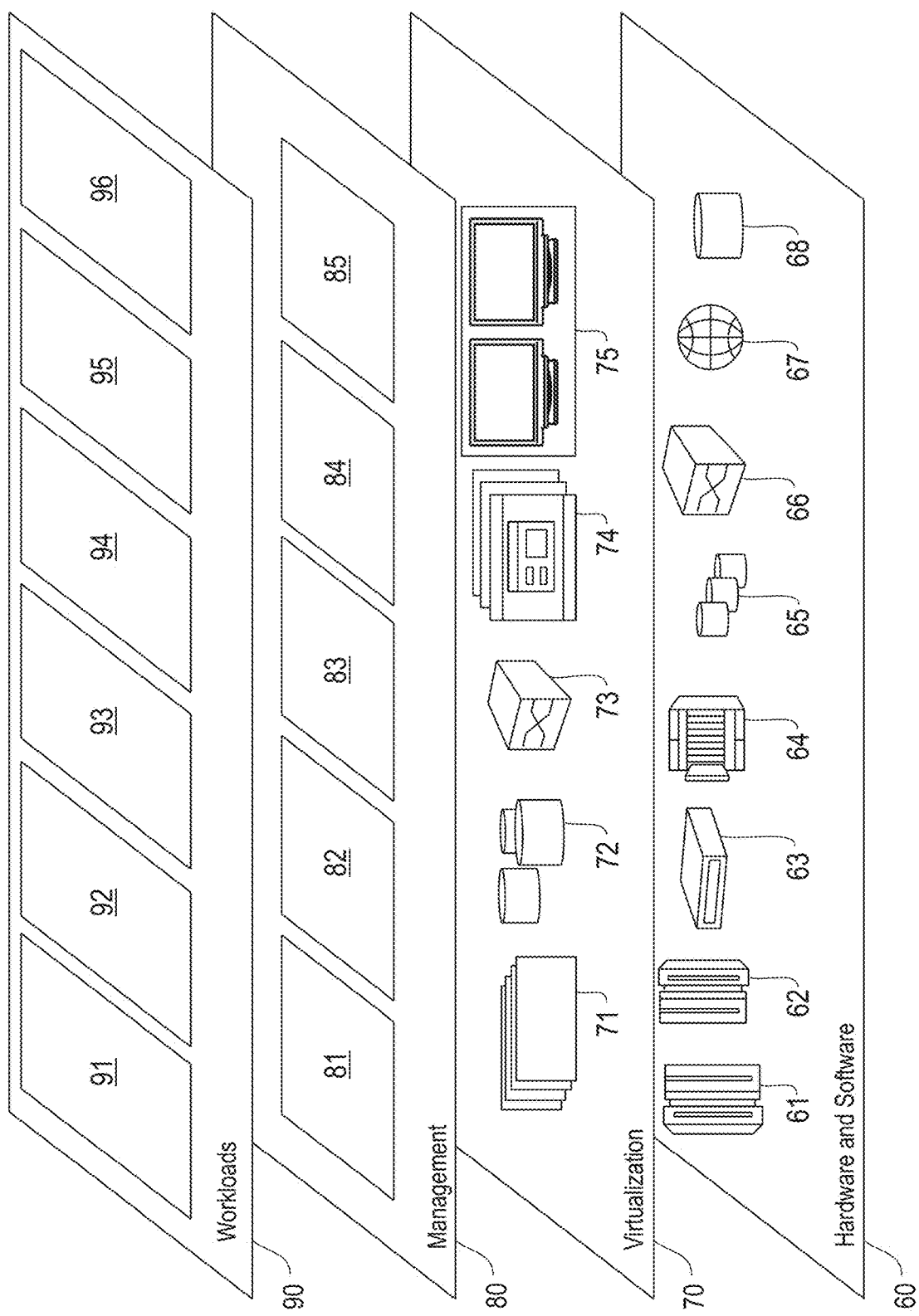
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and controlling compliance remediations processing 96. As mentioned above, all of the foregoing examples described with respect to FIG. 2 are illustrative only, and the embodiments are not limited to these examples.

It is reiterated that although this disclosure includes a detailed description on cloud computing, implementation of the teachings recited herein are not limited to a cloud computing environment. Rather, the embodiments may be implemented with any type of clustered computing environment now known or later developed.

Figure 3:
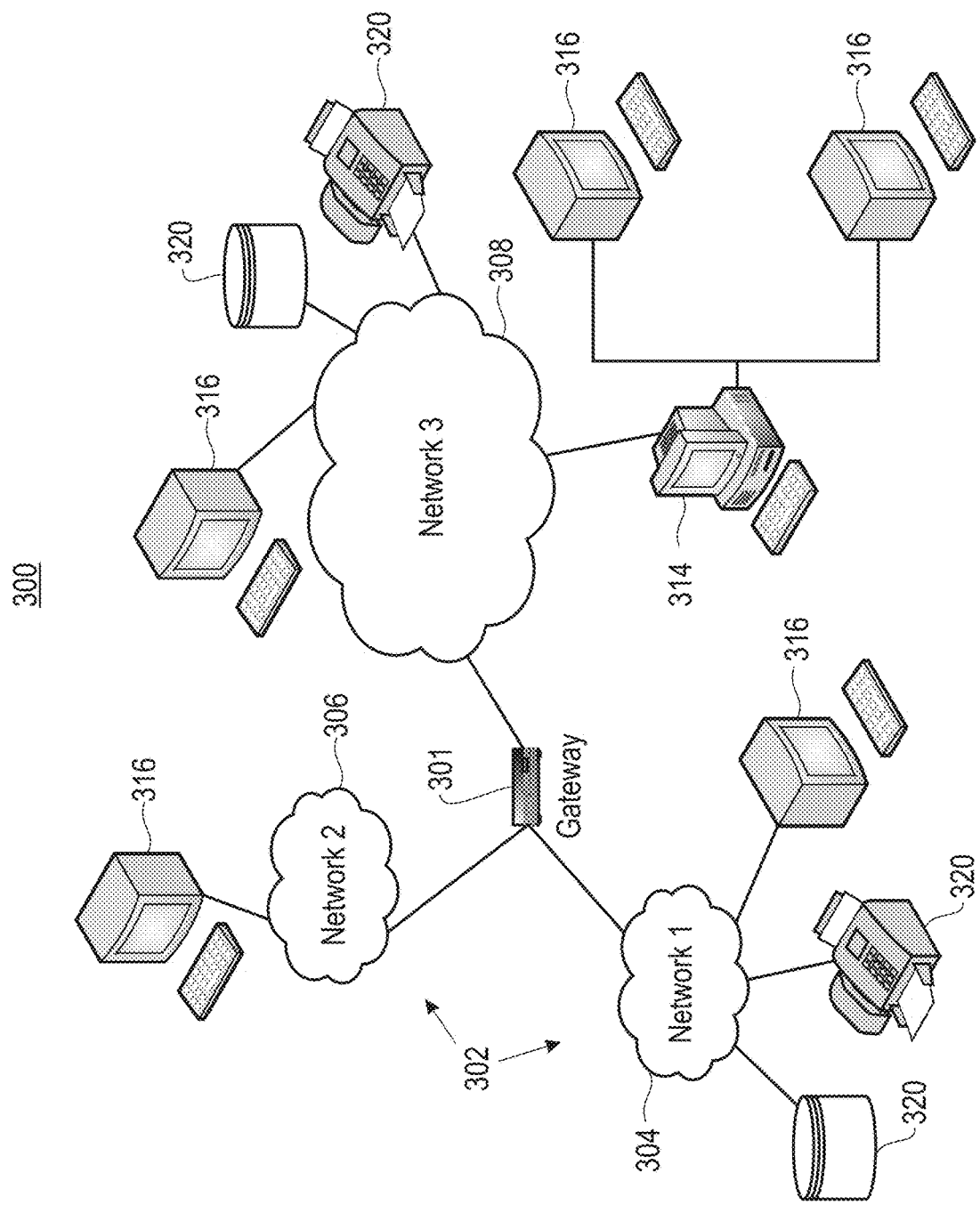
FIG. 3 is a network architecture of a system for controlling compliance remediations processing, according to an embodiment.

FIG. 3 is a network architecture of a system 300 for controlling compliance remediations, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
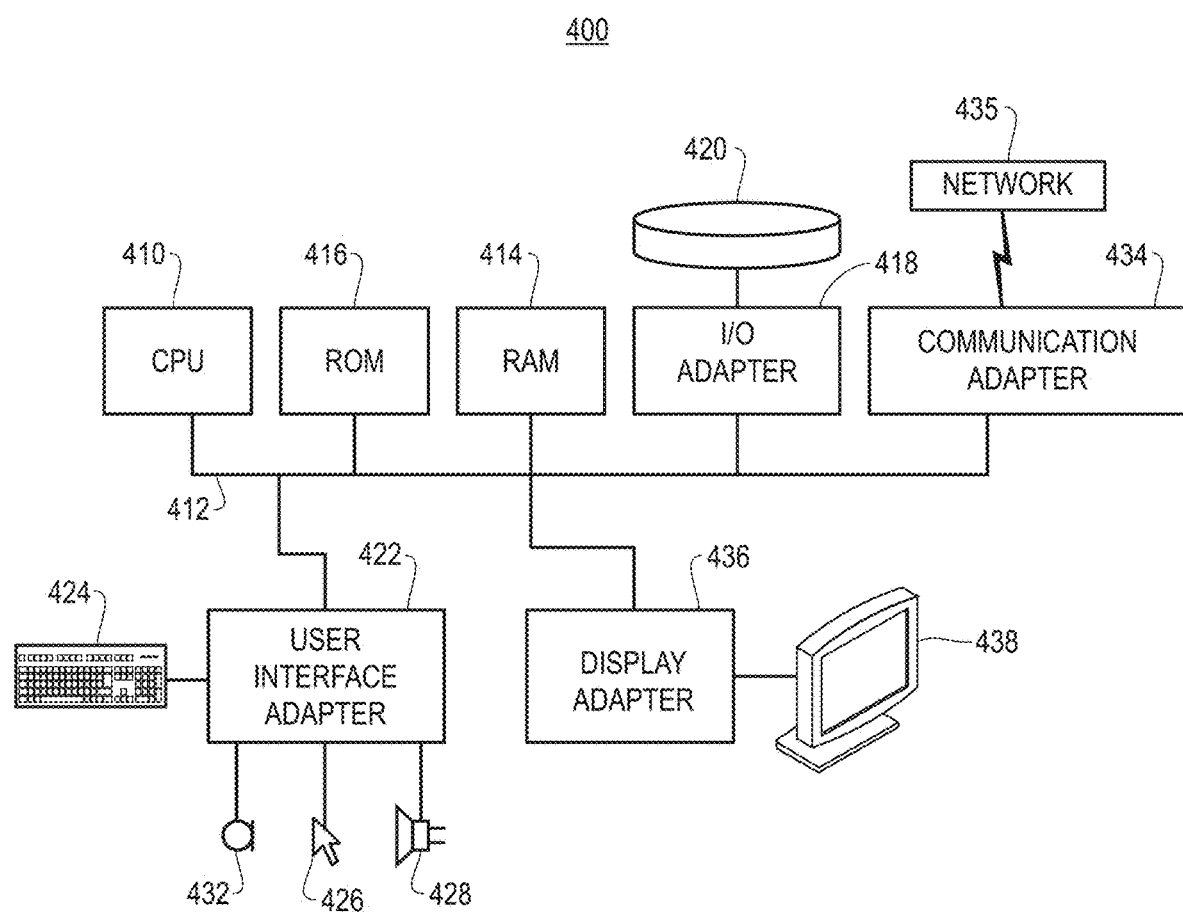
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

FIG. 5 is a block diagram illustrating a distributed system 500 that may be employed for controlling compliance remediations processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices 510 are provided with cloud services from the servers 530 through the cloud or resource sharing environment 520.

In one embodiment, instead of performing compliance remediations immediately upon detecting an issue, the system 500 provides processing for performing an inspection run (that will only detect compliance policy deviations, but not remediate them). System 500 gathers the inspection results of the inspection runs from each account in a regional CPA service that determines if remediations are required by analyzing the inspection results combined with determining a current compliance mode (enforce/inspect/pause) of a server. The current compliance mode of a server is one of an enforce (or enforcement) mode, an inspect (or inspection) mode, or a pause (or suspend) mode. In the enforce mode, the server provides CPA service processing that involves enforcing compliance policies (i.e., compliance enforcement). In the inspect mode, the server provides CPA service processing that detects policy deviations from the compliance polices based on inspection results of inspection runs. In pause mode, the server pauses or suspends CPA service processing. In one embodiment, if the server is in enforcement mode, then the regional CPA service also looks to determine whether the policy fingerprint (e.g., details, elements, rules, etc.) has changed (i.e., changes were made recently to the effective compliance policies being applied to this server—the server takes into consideration node-level, profile level and environment level changes as well as detect whether the version of the compliance policy was just upgraded). If the policy fingerprint has changed within the last NN hours (configurable), then the regional CPA service automatically falls back to inspection mode. If the policy fingerprint has not changed, then the server is then remediated. More generally, the regional CPA service analyzes trends, and determines, based on these trends, whether compliance enforcement runs (or processing) should be stopped for a certain set of compliance policies, or a specific set of servers. Once the trend analysis and retrieval of the policy versions are performed, the regional CPA service sends a rule to the account CPA service, which describes under what circumstances enforcement mode should be overridden on a server. Moreover, the regional CPA service incorporates into its analysis the audit rules (e.g., rules to monitor events and create entries, etc.) applicable, and sends the account CPA service the corresponding rules.

Figure 6:
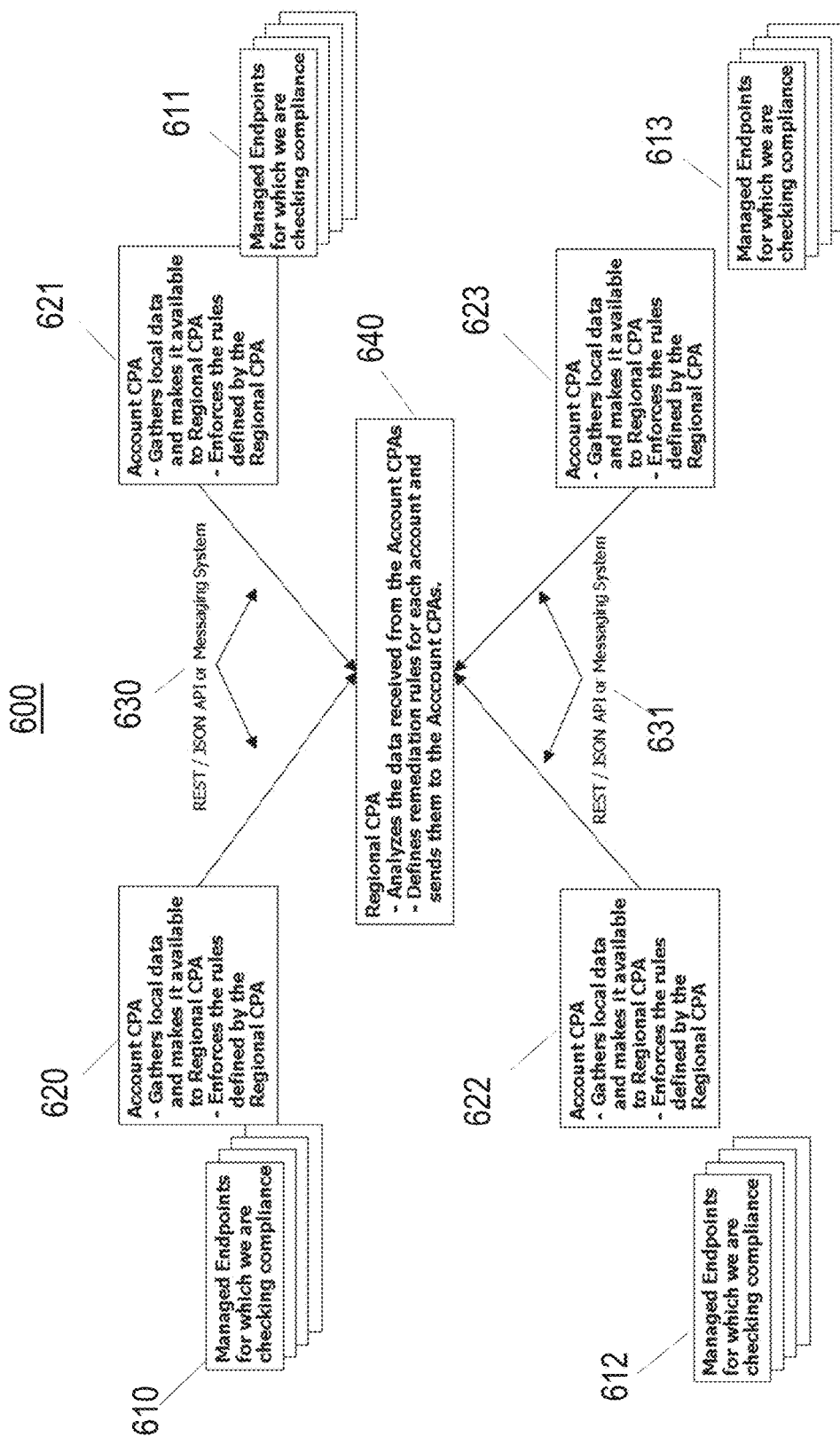
FIG. 6 illustrates a block diagram of components of a system for controlling compliance remediations processing, according to one embodiment.

FIG. 6 illustrates a block diagram of components of a system 600 for controlling compliance remediations processing, according to one embodiment Instead of performing remediations immediately upon detecting an anomaly/issue, system 600 performs an inspection run that detects policy deviations, but does not remediate them. The inspection results of the inspection runs are then gathered from each account in a regional CPA service, which performs the processing as described below. This is different from the traditional CPA service processing that is run in three phases where a compliance check is performed on the managed endpoints (first phase); the results of the compliance check are analyzed and any security exceptions are defined (second phase); and the endpoint is moved in enforcement mode where a set of scripts checks deviations from the policies in place and remediates those deviations (third phase).

In one embodiment, system 600 provides for constantly inspecting the status of the servers (e.g., servers in cloud computing environment 50, FIG. 1, hardware and software layer 60, FIG. 2, processing system 300, FIG. 3, distributed system 500, FIG. 5, an enterprise system, etc.). In one embodiment, the system 600 comprises a regional CPA service 640 processing that analyzes the data received from account CPA services (e.g., account CPA service processing 620, 621, 622, 623, etc.), defines remediation rules for each account and sends them to the account CPA services. In one embodiment, the account CPA services (e.g., CPA service processing 620, 621, 622, 623, etc.) gather/obtain local data and make this data available to the regional CPA service processing 640, and enforce the rules defined by the regional CPA service processing 640. Before performing any remediations, the regional CPA service processing 640 analyzes the number of deviations detected during the current inspection run, and analyzes those deviations for any anomalies. If any anomalies are detected, system 600 automatically suspends the compliance remediation process. If there are no anomalies (e.g., within a predetermined time period, such as 30 sec., 1 minute, 5 minutes, 1 hour, etc.), the process works as expected and is in compliance with the compliance policy. In one embodiment, the regional CPA service processing 640 is configurable, a set of rules are defined to perform the analysis, or machine learning is implemented to define and refine the set of rules in time. In one embodiment, the communications between the regional CPA service processing 640 and the account CPA services are conducted using communications API 630/631, which may be a representational state transfer (REST) application programming interface (API), a JavaScript object notation (JSON) API, a messaging system, etc.

In one embodiment, system 600 eases up the adoption process for new compliance policies, or compliance policies whose content has been changed. System 600 prevents any errors or bugs coming from the newly deployed software from propagating to the managed endpoints (e.g., managed endpoints 610/611/612/613/etc.). Upon detecting a trend of unusual deviations introduced by a new compliance policy, the regional CPA service processing 640 defines a rule that temporarily suspends any remediations for that account. In one embodiment, system 600 leverages the experience gained in one account and applies the knowledge to other accounts.

In one embodiment, the regional CPA service processing 640 determines whether to perform a remediation or not by analyzing scanned data that is being inspected for policy compliance. If the regional CPA service processing 640 detects any anomalies/abnormal patterns in the scans (e.g., many deviations compared to the previous day, etc.) system 600 does not perform the remediations. In one embodiment, the decision to make a remediation has nothing to do with the current compliance level of a client device, but rather with the pattern of the remediations performed. In one embodiment, the regional CPA service processing 640 creates/generates a machine learning model that provides for the system 600 to take action and determine that a certain remediation should stop.

In one embodiment, system 600 provides for controlling compliance remediations of computers located on the client premises/server. In one embodiment, the regional CPA service processing 640 performs an inspection run (that will only detect deviations, but not remediate them) and gathers the results of the inspection runs from each managed endpoint (e.g., managed endpoints 610/611/612/613/etc.) account in the regional CPA service processing 640. The regional CPA service processing 640 determines if remediations are required by processing the inspection results combined with a current compliance mode of a server, then enforces/inspects/pauses. If the server is in enforcement mode, then the regional CPA service processing 640 also determines whether the policy fingerprint has changed (i.e., changes were made recently to the effective compliance policies being applied to this server—it takes into consideration node-level, profile level and environment level changes as well as detection of whether the version of the policy was just upgraded). If the policy fingerprint has changed within the last NN hours (where NN are integers≥0, and are configurable), then the account CPA services automatically fall back to inspection mode. If the policy fingerprint has not changed, then the server is remediated. System 600 analyzes the trends by the regional CPA service processing 640, and determines, based on the trends, whether compliance enforcement should be stopped for a certain set of policies, or a specific set of servers. The regional CPA service processing 640 sends a rule to an account CPA service (e.g., CPA service processing 620, 621, 622, 623, etc.), which describes under what circumstances enforcement mode should be overridden on a server once the trend analysis and retrieval of the policy versions are performed. System 600 further incorporates the audit rules applicable by the regional CPA service processing 640 into its analysis and sends the account CPA service (e.g., CPA service processing 620, 621, 622, 623, etc.) the corresponding rules.

FIG. 7 illustrates an example of an account CPA (e.g., CPA service processing 620, 621, 622, 623, etc., FIG. 6) service flow 700, according to one embodiment. FIG. 8 illustrates an example of a regional CPA service flow 800, according to one embodiment. In one embodiment, in block 710 the account CPA service flow 700 receives inspection reports (including the inspection results) from local endpoints (e.g., managed endpoints 610/611/612/613/etc., FIG. 6). In block 720 the account CPA service flow 700 processes/ aggregates inspection reports and sends them to the regional CPA service processing 640 (FIG. 6), which corresponds to the regional CPA service flow 800 block 810. In block 820, the regional CPA service flow 800 analyzes the inspection reports and detects new policies and new remediation trends using a machine learning model. In block 830, the regional CPA service flow 800 reads the audit rules for each account for the managed endpoints (e.g., managed endpoints 610/ 611/612/613/etc., FIG. 6). In block 840, the regional CPA service flow 800 defines remediation rules for the account(s) based on the analysis of the deviations and the account configuration (e.g., audit rules, etc.). In block 850, the regional CPA service flow 800 sends the rules to block 730 of the account CPA service flow 700, which receives the new set of rules from the regional CPA service processing 640. In block 740, the account CPA service flow 700 enforces the rules received from the regional CPA service processing 640.

Figure 9:
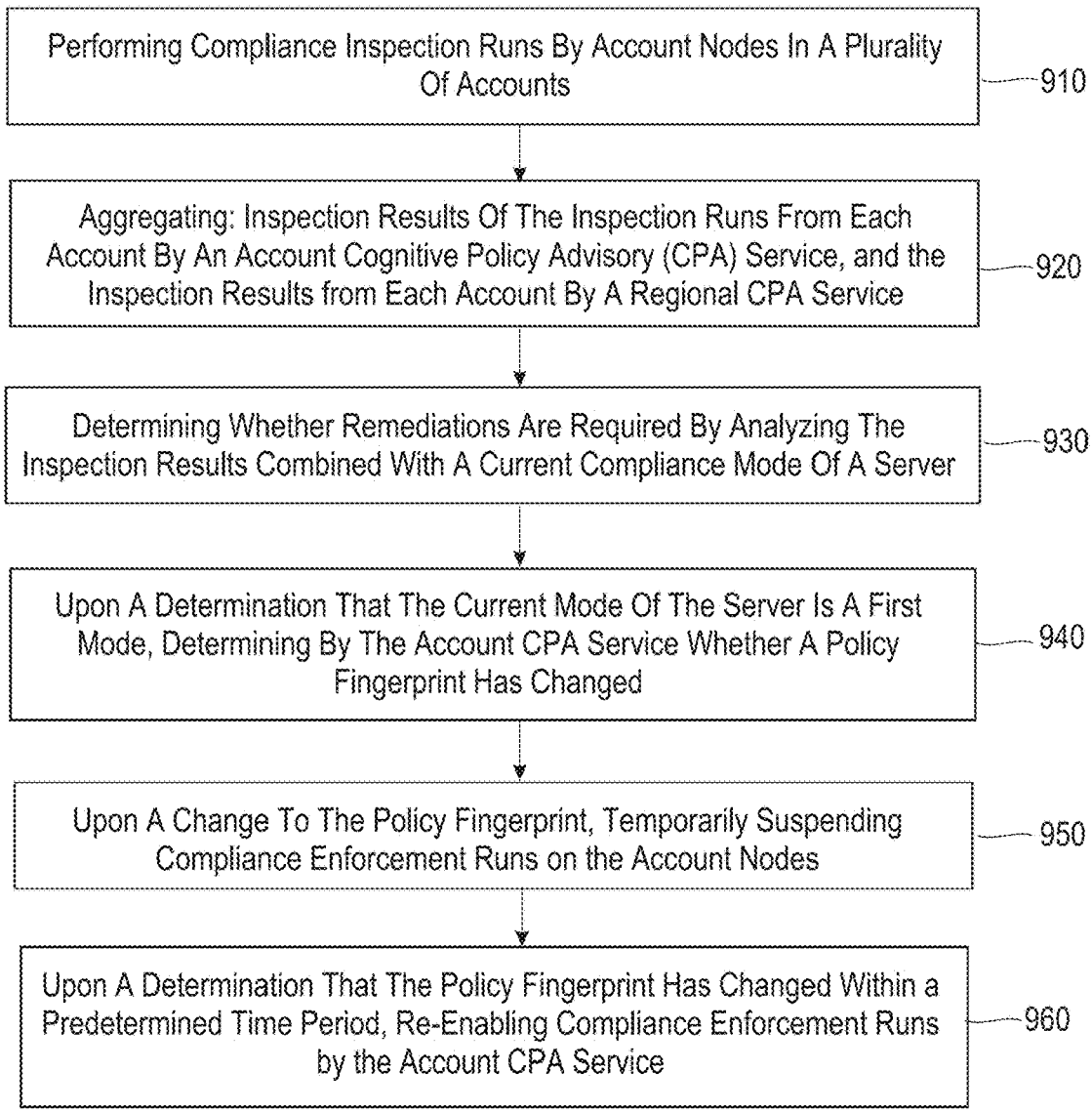
FIG. 9 illustrates a block diagram of a process for controlling compliance remediations, according to one embodiment.

FIG. 9 illustrates a block diagram of a process 900 for controlling compliance remediations, according to one embodiment. In block 910, process 900 includes performing a compliance inspection runs by account nodes in multiple accounts, such as managed endpoints 610 (FIG. 6, e.g., using a processor from computing node 10, FIG. 1, hardware and software layer 60, FIG. 2, processing system 300, FIG. 3, system 400, FIG. 4, system 500, FIG. 5, system 600, FIG. 6, etc.). In block 920, process 900 aggregates results of the inspection runs from each account node by an account CPA service, and aggregates the results from each account by a regional CPA service. In block 930, process 900 determines whether remediations are required by analyzing the inspection results combined with a current compliance mode of a server (e.g., a server in cloud computing environment 50, FIG. 1, hardware and software layer 60, FIG. 2, processing system 300, FIG. 3, distributed system 500, FIG. 5, an enterprise system, etc.). In block 940, upon a determination that the current compliance mode of the server is a first mode (e.g., enforcement mode), process 900 determines, by the account CPA service, whether a policy fingerprint (e.g., policy details, policy elements, rules, etc.) has changed. In block 950, upon a change to the policy fingerprint, process 900 temporarily suspends compliance enforcement runs on the account nodes.

In one embodiment, process 900 may further include that upon a determination that the policy fingerprint has changed within a (configurable) predetermined time period, process 900 re-enables compliance enforcement by the account CPA service. In one embodiment, the predetermined time period provides for a configurable amount of time to check for a policy change from the last time that an inspection is performed. In one embodiment, upon a determination that the policy fingerprint has not changed, process 900 remediates the server. Process 900 may further provide that the regional CPA service analyzes policy deviation trends. Based on the policy deviation trends, process 900 may determine, by the regional CPA service, whether to stop compliance enforcement.

In one embodiment, process 900 further includes sending a rule to the account CPA service by the regional CPA service. The rule describes under what circumstances the first mode should be overridden on the server after the analyzing policy deviation trend and retrieval of policy versions is performed. Process 900 may also include incorporating audit rules applicable by the regional CPA service into its analysis, and sending the account CPA service the audit rules.

In one embodiment, in process 900 the first mode is an enforcement mode, a second mode is an inspect mode and a third mode is a pause mode. In one embodiment, the policy fingerprint change includes changes made recently to effective policies being applied to the server, and the server considers node-level, profile level and environment level changes as well as detects version changes of the policy fingerprint.

In one embodiment, in process 900 determining whether to stop compliance enforcement is applicable for a certain set of policies or a specific set of servers. In one embodiment, the inspection run detects deviations and does not remediate the deviations.

One or more embodiments may be a system, a method, and/or a computer program product at any possible technical detail level of integration. The computer program product may include a computer readable storage medium (or media) having computer readable program instructions thereon for causing a processor to carry out aspects of the present embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (MID), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented, programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. in the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiments.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiment was chosen and described in order to best explain the principles of the embodiments and the practical application, and to enable others of ordinary skill in the art to understand the embodiments for various embodiments with various modifications as are suited to the particular use contemplated.

What is claimed is:

1. A method for controlling compliance remediation, comprising:
    performing compliance inspection runs by account nodes in a plurality of accounts;
    aggregating inspection results of the compliance inspection runs from each account node by an account cognitive policy advisory (CPA) service;
    aggregating the inspection results from each account by a regional CPA service;
    determining whether remediations are required by analyzing the inspection results combined with a current compliance mode of a server;
    upon a determination that the current compliance mode of the server is a first mode, determining by the account CPA service whether a policy fingerprint has changed;
    upon a change to the policy fingerprint, temporarily suspending compliance enforcement runs on the account nodes; and upon a determination that the policy fingerprint has changed within a predetermined time period, re-enabling the compliance enforcement runs by the account CPA service.

2. The method of claim 1, further comprising:
upon a determination that the policy fingerprint has not changed, remediating the server;
analyzing, by the regional CPA service, policy deviation trends; and
based on the policy deviation trends, determining, by the regional CPA service, whether to stop the compliance enforcement runs.

3. The method of claim 2, further comprising:
sending a rule to the account CPA service by the regional CPA service, wherein the rule describes under what circumstances the first mode should be overridden on the server after the analyzing policy deviation trends and retrieval of policy versions are performed.

4. The method of claim 3, further comprising:
incorporating audit rules applicable by the regional CPA service into its analysis; and
sending the audit rules to the account CPA service.

5. The method of claim 3, wherein the first mode is an enforcement mode.

6. The method of claim 4, wherein the policy fingerprint change comprises changes made recently to effective policies being applied to the server, and the server considers node-level, profile level and environment level changes as well as detects version changes of the policy fingerprint.

7. The method of claim 1, wherein each inspection run detects deviations and does not remediate the deviations.

8. A computer program product for controlling compliance remediation, the computer program product comprising a computer readable storage medium having program instructions embodied therewith, the program instructions executable by a processor to cause the processor to:
perform, by the processor, compliance inspection runs by account nodes in a plurality of accounts;
aggregate, by the processor, inspection results of the compliance inspection runs from each account node by an account cognitive policy advisory (CPA) service;
aggregate, by the processor, the inspection results from each account by a regional CPA service;
determine, by the processor, whether remediations are required by analyzing the inspection results combined with a current compliance mode of a server;
upon a determination that the current compliance mode of the server is a first mode, determine by the account CPA service, whether a policy fingerprint has changed;
upon a change to the policy fingerprint, temporarily suspend, by the processor, compliance enforcement runs on the account nodes; and
upon a determination that the policy fingerprint has changed within a predetermined time period, re-enabling, by the processor, the compliance enforcement runs by the account CPA service.

9. The computer program product of claim 8, wherein the program instructions executable by the processor further cause the processor to:
upon a determination that the policy fingerprint has not changed, remediate, by the processor, the server;
analyze, by the regional CPA service, policy deviation trends; and
based on the policy deviation trends, determine, by the regional CPA service, whether to stop compliance enforcement runs.

10. The computer program product of claim 9, wherein the program instructions executable by the processor further cause the processor to:
send, by the regional CPA service, a rule to the account CPA service, wherein the rule describes under what circumstances the first mode should be overridden on the server after the analyzing policy deviation trend and retrieval of policy versions are performed.

11. The computer program product of claim 10, wherein the program instructions executable by the processor further cause the processor to:
incorporate, by the regional CPA service, audit rules applicable into the regional CPA service analysis; and
send, by the regional CPA service, the audit rules to the account CPA service.

12. The computer program product of claim 10, wherein the first mode is an enforcement mode.

13. The computer program product of claim 11, wherein the policy fingerprint change comprises changes made recently to effective policies being applied to the server, and the server considers node-level, profile level and environment level changes as well as detects version changes of the policy fingerprint.

14. The computer program product of claim 9, wherein each inspection run detects deviations and does not remediate the deviations.

15. An apparatus comprising:
a memory configured to store instructions; and
a processor configured to execute the instructions to:
perform compliance inspection runs by account nodes in a plurality of accounts;
aggregate inspection results of the inspection runs from each account node by an account cognitive policy advisory (CPA) service;
aggregate the inspection results from each account by a regional CPA service;
determine whether remediations are required by analyzing the inspection results combined with a current compliance mode of a server;
upon a determination that the compliance mode of the server is a first mode, determine by the account CPA service, whether a policy fingerprint has changed;
upon a change to the policy fingerprint, temporarily suspend compliance enforcement runs on the account nodes; and
upon a determination that the policy fingerprint has changed within a predetermined time period, re-enabling the compliance enforcement runs by the account CPA service.

16. The apparatus of claim 15, wherein the processor is further configured to execute the instructions to:
upon a determination that the policy fingerprint has not changed, remediate the server;
analyze, by the regional CPA service, policy deviation trends; and
based on the policy deviation trends, determine, by the regional CPA service, whether to stop the compliance enforcement runs.

17. The apparatus of claim 16, wherein the processor is further configured to execute the instructions to:
send, by the regional CPA service, a rule to the account CPA service, wherein the rule describes under what circumstances the first mode should be overridden on the server after the analyzing policy deviation trend and retrieval of policy versions are performed.

18. The apparatus of claim 17, wherein the processor is further configured to execute the instructions to:

incorporate, by the regional CPA service, audit rules applicable into the regional CPA service analysis; and send, by the regional CPA service, the audit rules to the account CPA service.

19. The apparatus of claim 17, wherein:

the first mode is an enforcement mode;

the policy fingerprint change comprises changes made recently to effective policies being applied to the server; and the server considers node-level, profile level and environment level changes as well as detects version changes of the policy fingerprint.

20. The apparatus of claim 15, wherein each inspection run detects deviations and does not remediate the deviations.

\* \* \* \* \*